United States Patent
Freestone et al.

(10) Patent No.: US 10,326,209 B2
(45) Date of Patent: Jun. 18, 2019

(54) LATTICE STRUCTURE DESIGN AND MANUFACTURING TECHNIQUES

(71) Applicant: Space Systems/Loral, LLC, Palo Alto, CA (US)

(72) Inventors: Michael Paul Freestone, El Granada, CA (US); Daniel Albino Rodrigues, Mountain View, CA (US); Gregory David Carini, San Jose, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 0 days.

(21) Appl. No.: 15/622,888

(22) Filed: Jun. 14, 2017

(65) Prior Publication Data
US 2018/0366833 A1    Dec. 20, 2018

(51) Int. Cl.
| | | |
|---|---|---|
| *H01Q 15/14* | (2006.01) | |
| *H01Q 1/28* | (2006.01) | |
| *B29C 35/02* | (2006.01) | |
| *B29C 70/24* | (2006.01) | |

(52) U.S. Cl.
CPC ........... *H01Q 15/144* (2013.01); *B29C 35/02* (2013.01); *B29C 70/24* (2013.01); *H01Q 1/288* (2013.01); *H01Q 15/142* (2013.01)

(58) Field of Classification Search
CPC .......... H01Q 1/36; H01Q 15/14; H01Q 15/20; H01Q 15/142; H01Q 15/144; H01Q 1/288
See application file for complete search history.

(56) References Cited

U.S. PATENT DOCUMENTS

| | | | |
|---|---|---|---|
| 4,812,854 A | * | 3/1989 | Boan ............... H01Q 1/368 343/897 |
| 4,819,399 A | | 4/1989 | Onoda |
| 5,579,609 A | | 12/1996 | Sallee |
| 5,686,930 A | | 11/1997 | Brydon |
| 6,064,352 A | | 5/2000 | Silverman et al. |
| 6,417,818 B2 | | 7/2002 | Shipley et al. |
| 7,281,809 B2 | | 10/2007 | Warren |
| 9,685,710 B1 | | 6/2017 | Hijmans et al. |
| 2004/0009728 A1 | | 1/2004 | Kubomura et al. |

(Continued)

FOREIGN PATENT DOCUMENTS

| | | |
|---|---|---|
| JP | 5739550 | 6/2015 |
| WO | WO 2013/011049 A1 | 1/2013 |

OTHER PUBLICATIONS

Suntek, "Tensegrity Climate Envelope," http://suntekllp.com/26.php [Retrieved from http://web.archive.org/web/20161108115050/http://suntekllp.com/26.php on Mar. 23, 2017], Internet Archive Wayback Machine, Nov. 2, 2011-Nov. 8, 2016, 8 pages.

(Continued)

*Primary Examiner* — Hoang V Nguyen
(74) *Attorney, Agent, or Firm* — Weaver Austin Villeneuve & Sampson LLP (57) ABSTRACT

A lattice structure includes a plurality of strut elements, each strut element formed by coupling one or more lengths of uncured graphite fiber reinforced polymer (GFRP) tow or yarn with posts so as to form a lattice, then curing the lattice. The lattice may include a plurality of open tetrahedral-like truss arrangements, each open tetrahedral-like truss arrangement including six strut elements and four posts.

20 Claims, 8 Drawing Sheets

(56) References Cited

U.S. PATENT DOCUMENTS

| | | | |
|---|---|---|---|
| 2004/0113863 A1* | 6/2004 | Stonier | H01Q 1/288 343/897 |
| 2004/0128940 A1* | 7/2004 | LaForge | E04H 12/10 52/655.1 |
| 2013/0276308 A1 | 10/2013 | Kang et al. | |
| 2014/0191925 A1* | 7/2014 | Theunissen | H01Q 15/14 343/912 |
| 2016/0251093 A1* | 9/2016 | Hijmans | B64G 9/00 244/173.1 |

OTHER PUBLICATIONS

Extended European Search Report dated Oct. 25, 2018 in EP Application No. 18175415.1.

* cited by examiner

LATTICE STRUCTURE DESIGN AND MANUFACTURING TECHNIQUES

TECHNICAL FIELD

This invention relates generally to a lattice structure, and more particularly to a 3-D lattice of open tetrahedral-like truss arrangements and techniques for forming the lattice structure.

BACKGROUND OF THE INVENTION

The assignee of the present invention manufactures and deploys spacecraft for, inter alia, communications and broadcast services.

Spacecraft structures, including particularly radio frequency (RF) antenna reflectors, are required to be compatible with launch loads, and must also comply, subsequent to launch, with challenging performance specifications in the face of substantial temperature variations and radiation exposure, typical of a space environment. Furthermore, such structures must be designed in view of stringent mass and cost objectives.

Laminated composite structures for such applications have been described, for example, in U.S. Pat. No. 5,686,930, and U.S. Pat Pub. 2004/0113863, and U.S. patent application Ser. No. 14/161,343, assigned to the assignee of the present invention, and in U.S. Pat Pub. 2004/0009728. Alternative techniques include a "strong-back" approach where a shell fabricated as a sandwich or stiffened membrane is attached to a stiff backup structure using a number of blade type flexures to isolate the shell from the backup structure.

Improved design and fabrication techniques for RF antenna reflectors that achieve excellent RF performance, compatibility with launch environmental loads, and relatively low mass and cost are desired.

SUMMARY

The present inventors have appreciated that a lattice structure including a number of open tetrahedral-like truss arrangements can yield significant improvements in mass, stiffness and thermal distortion, particularly where the truss arrangement includes truss elements formed by coupling one or more lengths of uncured graphite fiber reinforced polymer tow or yarn to pre-cured graphite posts so as to form a lattice, then curing the lattice.

According to some implementations, an apparatus includes a lattice structure, the structure including a plurality of strut elements and posts, the plurality of strut elements formed by coupling one or more lengths of uncured graphite fiber reinforced polymer (GFRP) tow or yarn with the posts so as to form a lattice, then curing the lattice.

In some examples, the GFRP tow may be an untwisted bundle of continuous filaments.

In some examples, the posts may be pre-cured graphite.

In some examples, the lattice may include a plurality of open tetrahedral-like truss arrangements, each open tetrahedral-like truss arrangement including six strut elements and four pre-cured graphite posts. In some examples, each open tetrahedral-like truss arrangement may be disposed within an open rectangular cuboid formed by coupling one or more additional lengths of uncured GFRP tow or yarn to the pre-cured graphite posts, then curing the lattice. In some examples, each of the plurality of truss arrangements may share at least one post and one strut element with an adjoining one of the plurality of truss arrangements.

In some examples, the apparatus may further include a shaped RF-reflective skin, bonded to the lattice structure.

According to some implementations, a structure includes a plurality of open tetrahedral-like truss arrangements, each open tetrahedral-like truss arrangement including six truss elements formed by coupling one or more lengths of uncured graphite fiber reinforced polymer (GFRP) tow or yarn to pre-cured graphite posts so as to form a lattice of the truss arrangements, then curing the lattice.

In some examples, the GFRP tow may be an untwisted bundle of continuous filaments.

In some examples, each open tetrahedral-like truss elements may be disposed within an open rectangular cuboid formed by coupling one or more additional lengths of uncured GFRP tow or yarn to the pre-cured graphite posts.

In some examples, each of the plurality of truss arrangements may share at least one post and one strut element with an adjoining one of the plurality of truss arrangements.

According to some implementations, an antenna reflector includes a shaped RF-reflective skin and a lattice structure, the lattice structure including a plurality of strut elements, each strut element formed by coupling one or more lengths of uncured graphite fiber reinforced polymer (GFRP) tow or yarn with pre-cured graphite posts so as to form a lattice, then curing the lattice. The shaped skin is bonded to the lattice structure.

In some examples, the lattice may be shaped to conform to a surface contour of the shaped RF-reflective skin and then cured. In some examples, the lattice may include a plurality of open tetrahedral-like truss arrangements, each open tetrahedral-like truss arrangement including six strut elements and four pre-cured graphite posts.

In some examples, each open tetrahedral-like truss arrangement may be disposed within an open rectangular cuboid formed by coupling one or more additional lengths of uncured GFRP tow or yarn to the pre-cured graphite posts, then curing the lattice.

In some examples, the shaped RF-reflective skin may be a graphite composite.

According to some implementations, a method includes forming a plurality of strut elements for a lattice structure, by coupling one or more lengths of uncured graphite fiber reinforced polymer (GFRP) tow or yarn with pre-cured graphite posts so as to form a lattice and curing the lattice.

In some examples, the lattice may include a plurality of open tetrahedral-like truss arrangements, each open tetrahedral-like truss arrangement including six strut elements and four pre-cured graphite posts. In some examples, each open tetrahedral-like truss arrangement may be disposed within an open rectangular cuboid formed by coupling one or more additional lengths of uncured GFRP tow or yarn to the pre-cured graphite posts, then curing the lattice.

In some examples, the method may further include forming an antenna reflector by bonding a shaped graphite skin to the lattice structure.

BRIEF DESCRIPTION OF THE DRAWINGS

Features of the invention are more fully disclosed in the following detailed description of the preferred embodiments, reference being had to the accompanying drawings, in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

In some implementations, a structure includes a lattice of coupled, open, tetrahedral-like truss arrangements, each truss arrangement including six truss elements formed from cured lengths of graphite fiber reinforced polymer (GFRP) yarn or tow. The truss arrangement is described as 'tetrahedral-like" inasmuch as the six truss elements define four mutually coupled triangular faces. Unlike a regular tetrahedron, however, the triangular faces may not be equilateral (i.e., the strut elements of a truss arrangement are not necessarily all the same length).

In some implementations, an antenna reflector includes a single RF-reflective graphite skin that is backed by such an open lattice structure. The lattice structure may be constructed by, first, coupling lengths of uncured pre-preg GFRP to pre-cured graphite posts so as to form the lattice of coupled open tetrahedral shapes and then curing the resulting lattice.

Figure 1:
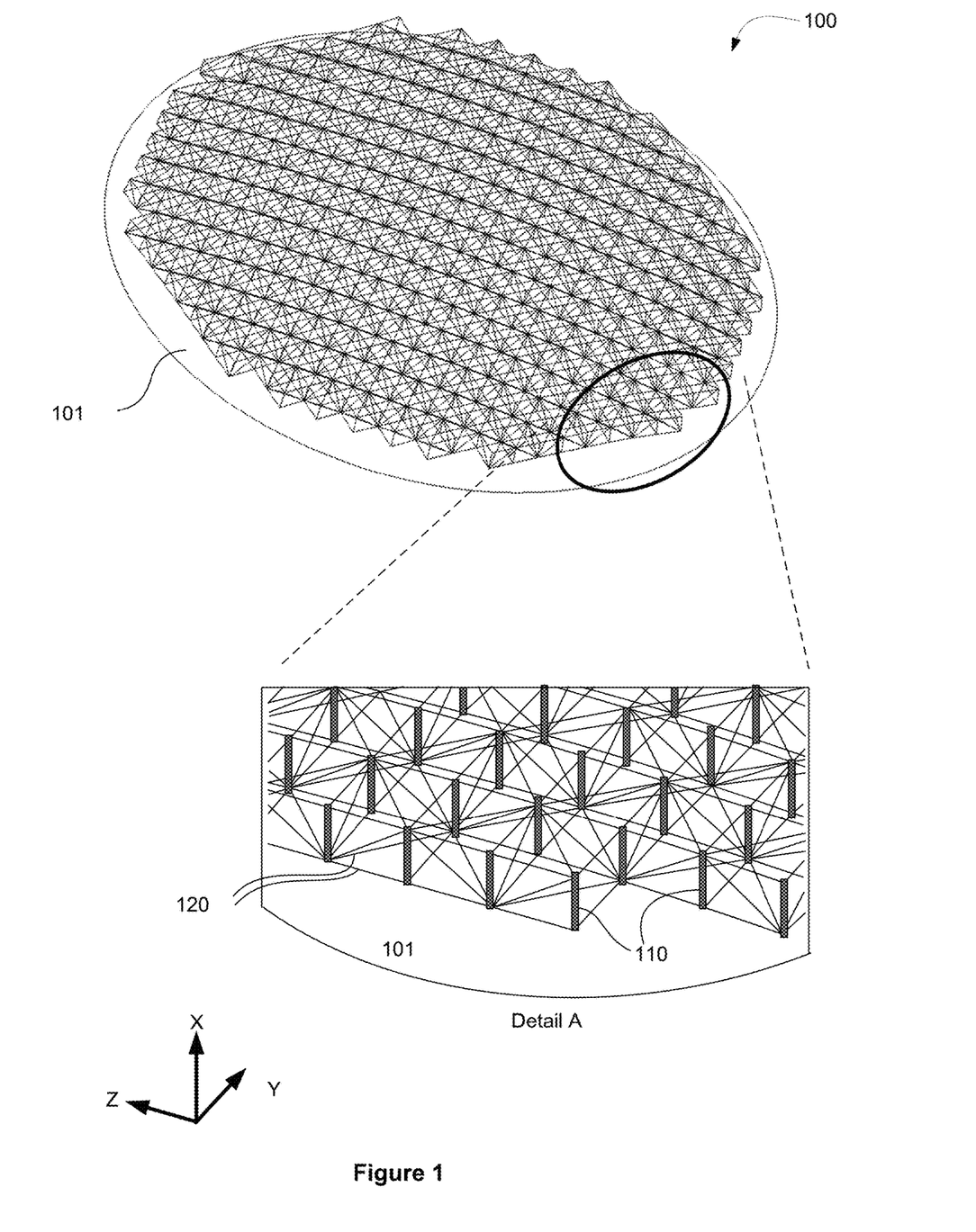
FIG. 1 illustrates a conceptual drawing of an antenna reflector according to an implementation.

FIG. 1 illustrates a conceptual drawing of an antenna reflector according to an implementation. The antenna reflector 100 includes a graphite skin 101 backed by the lattice structure, the lattice structure including a number of posts 110 and strut elements 120. The strut elements 120 may be formed by coupling one or more lengths of uncured graphite fiber reinforced polymer (GFRP) tow or yarn with the posts 110 so as to form a lattice. After the lattice has been formed, a cure process may be executed. In an implementation, the posts 110 are pre-cured graphite, each post having a first end that may be structurally connected (e.g., bonded) to the graphite skin 101.

Figure 2:
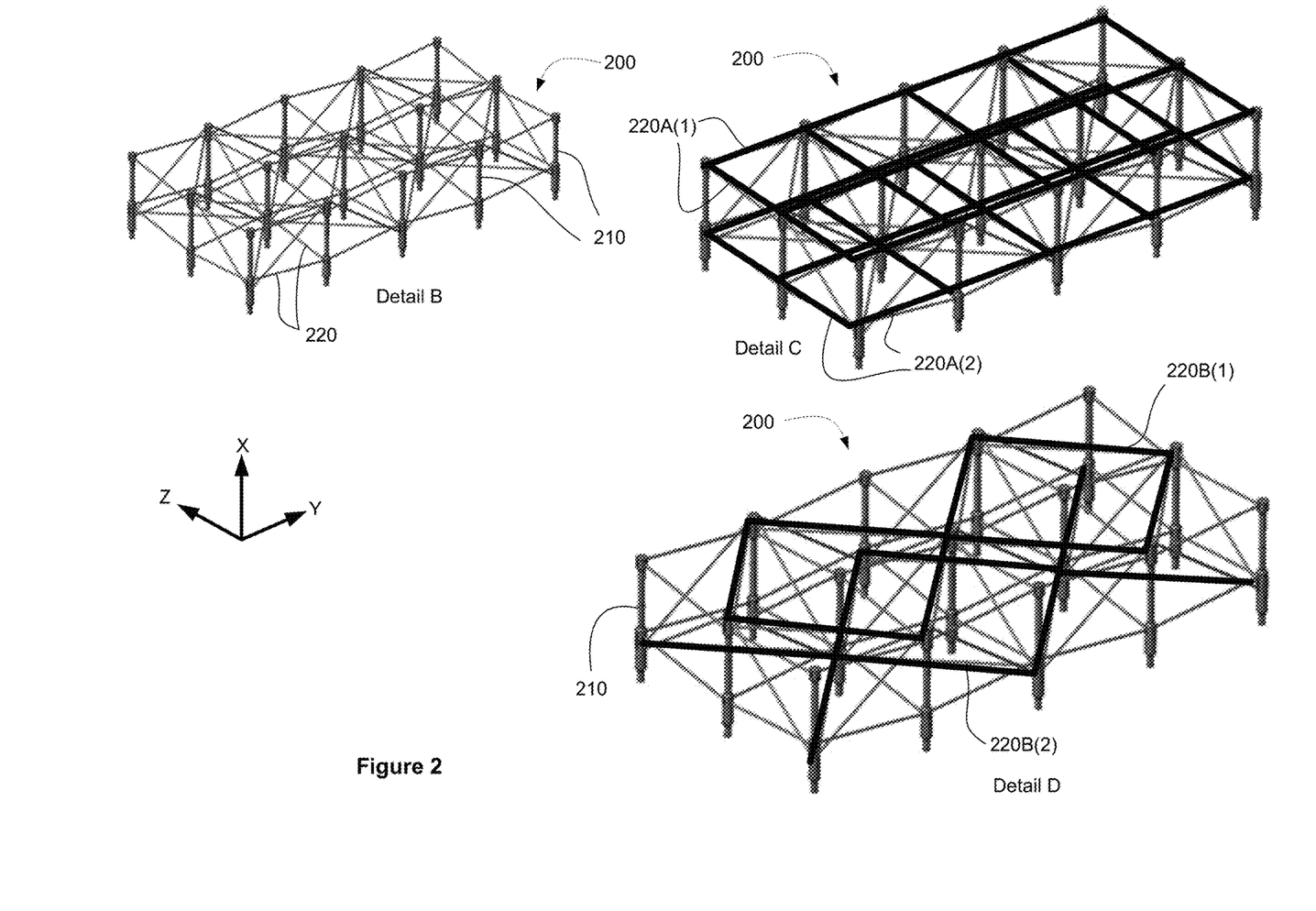
FIGS. 2 and 3 illustrate a lattice structure, according to an implementation.

FIG. 2 illustrates a lattice structure according to an implementation. For simplicity of illustration, the illustrated lattice structure 200 includes fifteen posts 210, a small fraction of the number of post contemplated by the lattice structure illustrated in FIG. 1. Detail B shows a conceptual isometric view of the lattice structure 200, including fifteen posts 210 and a number of strut elements 220. In an implementation, the posts are separated in the YZ plane by a lateral distance of approximately 4 inches and have a length, in the X direction, of approximately 2.5 inches and a diameter of about 0.2 inches. Strut elements 220 may have a diameter of approximately 0.1 inch. Accordingly, it will be appreciated that the lattice structure may have a very low density.

As may be better observed in Detail C, strut elements 220A(1) and 220A(2) are disposed in respective planes parallel to the YZ plane. The strut elements 220A(1) and 220A(2) may be connected with the posts 210 so as to form an array of open rectangular cuboids. In the illustrated implementation, a 2×4 array of eight rectangular cuboids may be observed.

As may be better observed in Detail D, additional strut elements 220B(1) and 220B(2) are disposed in respective planes parallel to the YZ plane so as to connect selected ends of some posts 210 in a diagonal manner.

Figure 3:
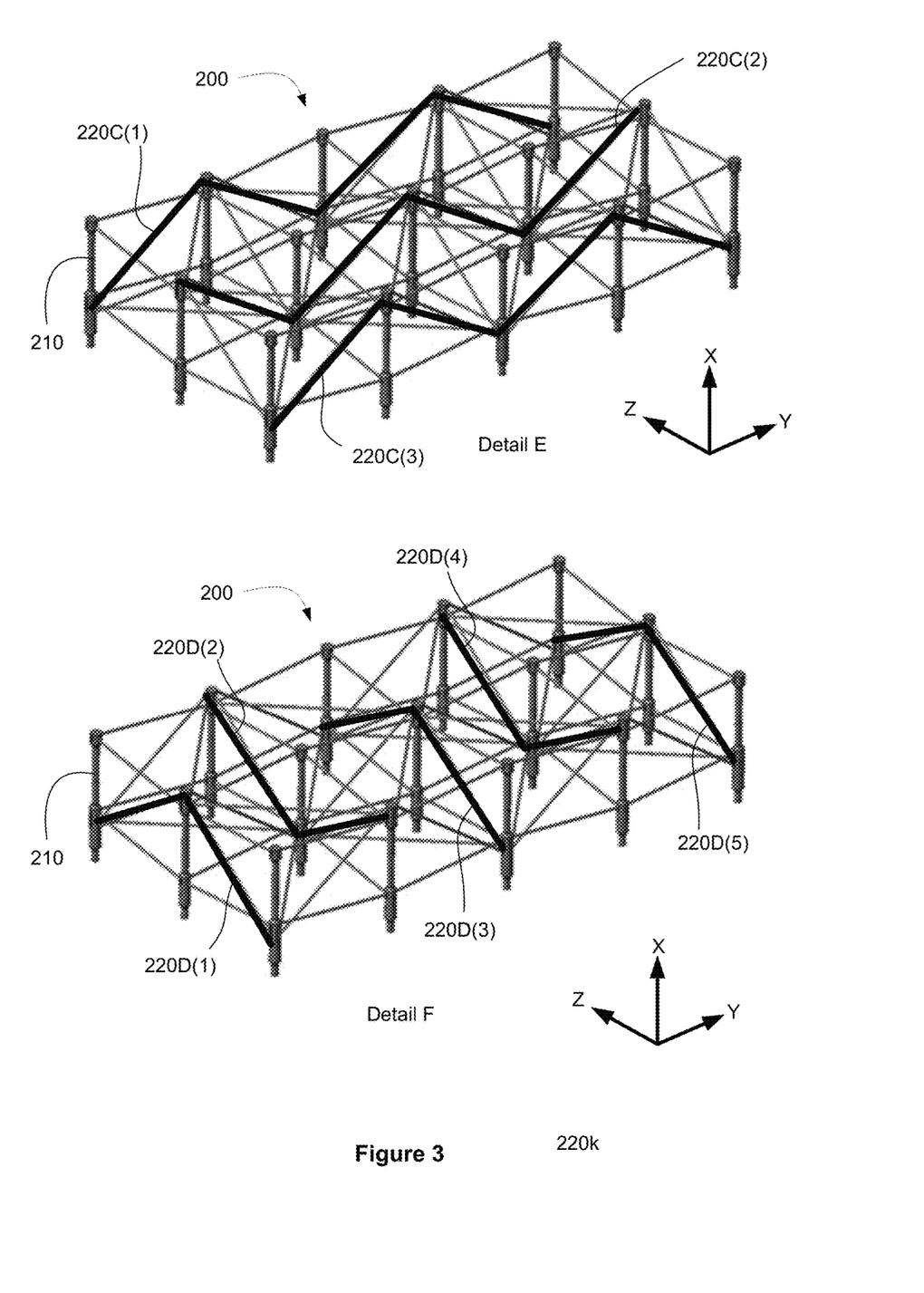

In addition, as may be better observed in FIG. 3, Detail E, additional strut elements 220C(1) and 220C(2) and 220C(3) are disposed in planes parallel to the XY plane so as to connect selected ends of some posts 210 in a diagonal manner. Similarly, as may be better observed in Detail F, additional strut elements 220D(1), 220D(2), 220D(3), 220D(4) and 220D(5) are disposed in planes parallel to the XZ plane so as to connect selected ends of some posts 210 in a diagonal manner.

Figure 4:
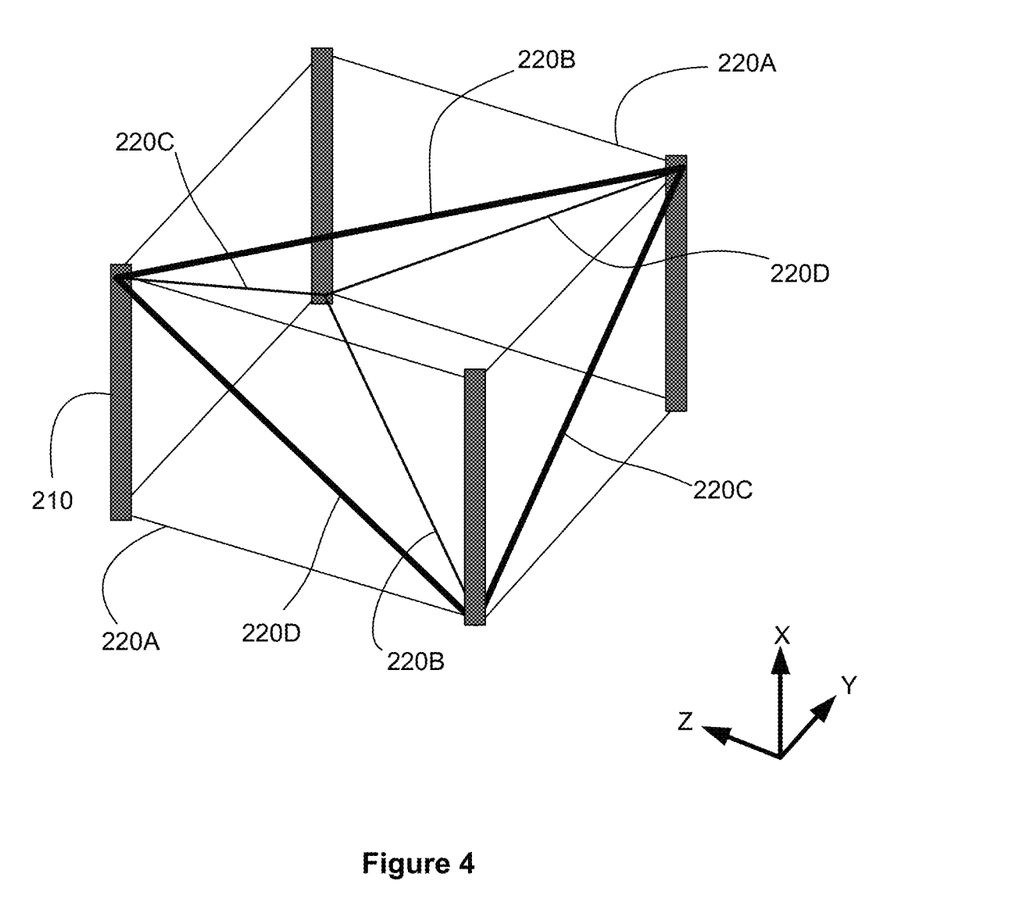
FIG. 4 illustrates an open tetrahedral-like truss arrangement, according to an implementation.

As may be more clearly observed in FIG. 4, diagonally disposed strut elements 220B, 220C, and 220D may form an open tetrahedral-like truss arrangement within a rectangular cuboid defined by posts 210 and strut elements 220A.

Figure 5:
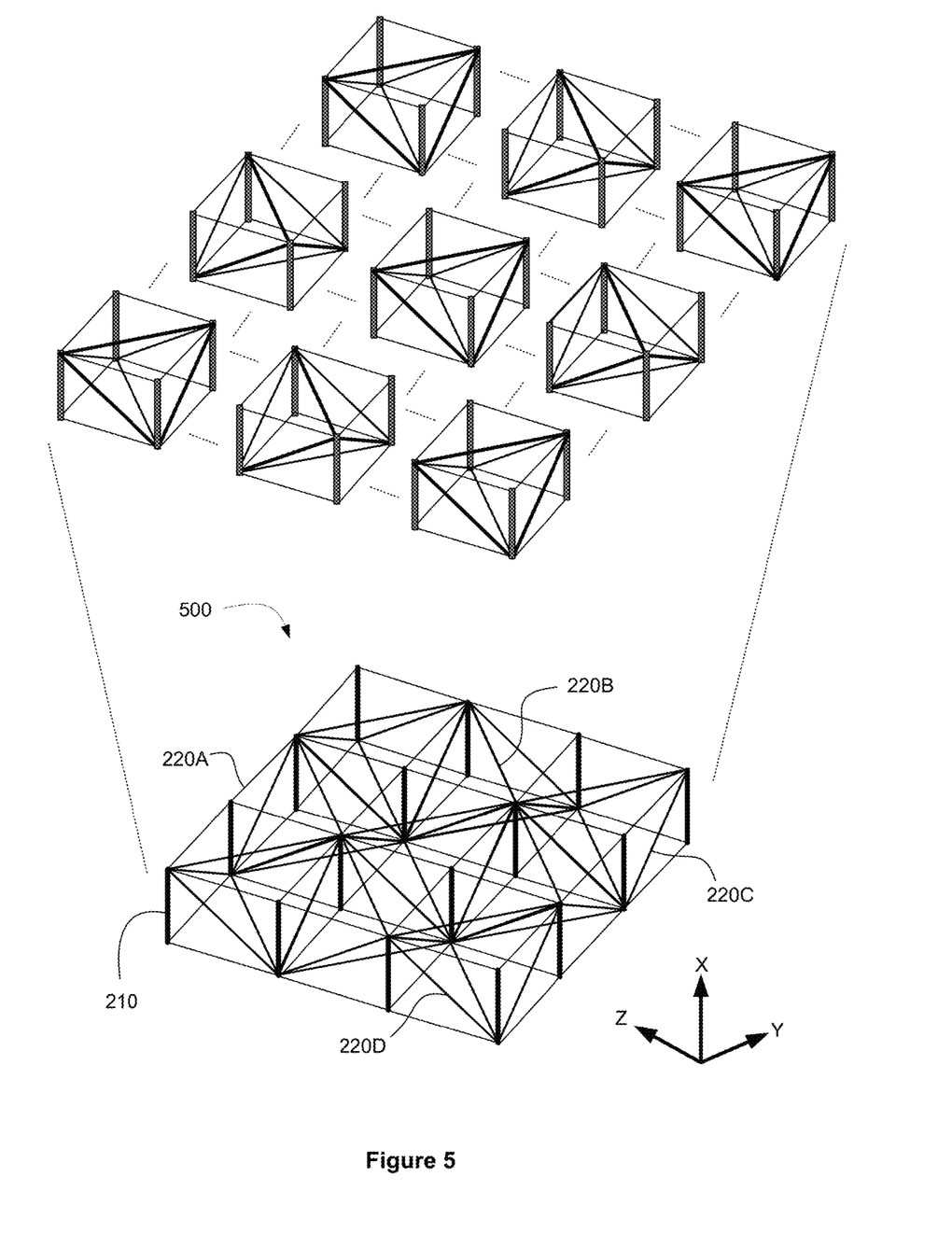
FIG. 5 illustrates a lattice structure including nine rectangular cuboids, according to another implementation.

FIG. 5 illustrates a lattice structure including nine rectangular cuboids, each including a respective tetrahedral-like truss arrangement. Considered separately, each tetrahedral-like truss arrangement may be described as including six diagonal truss elements and four posts. It will be appreciated, however, that in the assembled lattice, adjacent truss elements and posts are shared in common by adjacent truss arrangements. For example, in the 3×3 lattice structure 500, there are 16 posts 210. In addition, the 3×3 lattice structure 500 has 24 struts 220A and 9 struts 220B in each of two planes parallel to the YZ plane, 3 struts 220C in each of four planes parallel to the XY plane, and 3 struts 220D in each of four planes parallel to the XZ plane.

As indicated above, the posts 210 may be pre-cured graphite. The strut elements 220A, 220B, 220C, and 220D, may be formed by, for example, connecting lengths of uncured graphite fiber reinforced polymer (GFRP) tow or yarn to the posts. It will be appreciated that in the uncured state, each length of tow or yarn is flexibly bendable. As such, a length of tow or yarn may be laced or threaded from post to post along a non-linear path that may include multiple bends to form any number of strut elements. Upon completion of a lacing or threading process, in some implementations, the lattice may be cured in, for example, an oven, as a result of which the lengths of GFRP yarn or tow may develop a considerable bending stiffness and resistance to compressive loads. Moreover, the posts 210 and the cured connecting lengths 220 may each have a similarly low coefficient of thermal expansion.

Figure 6:
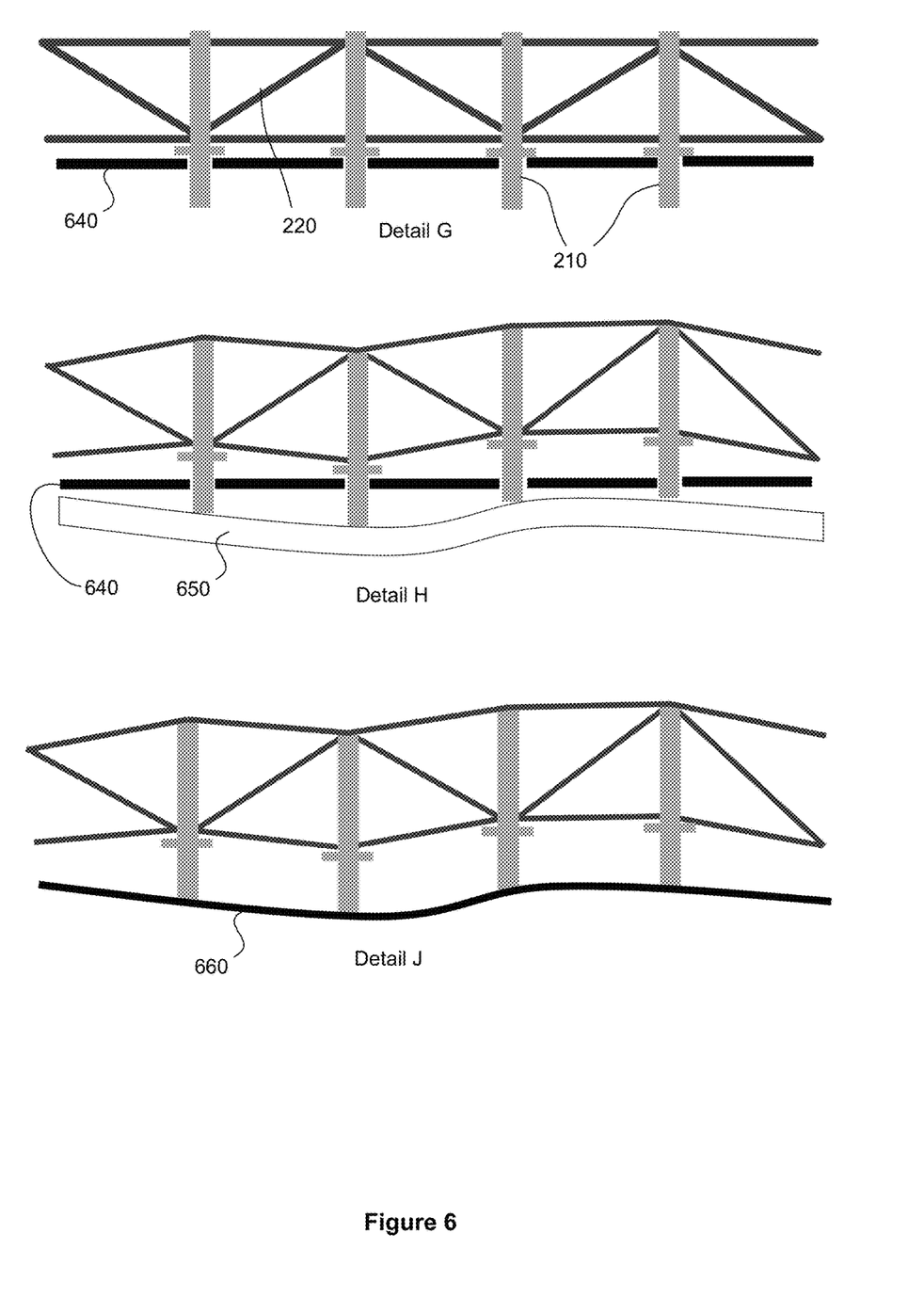
FIG. 6 illustrates techniques for fabricating a lattice structure, according to an implementation.

Referring now to FIG. 6, it is illustrated that the posts 210 may be temporarily installed in a plate 640 while uncured connecting lengths of GFRP tow or yarn 220 are laced between the posts 210, Detail G. Ordinarily, the plate 640 may be planar. If a planar lattice structure is desired, a curing process may be conducted using only the plate 640. However, in some implementations, for example for an antenna reflector, a non-planar lattice structure may be desired. For such implementations, as illustrated in Detail H, it is contemplated that a reflector surface tool 650 may be used to impart a desired nonplanar shape to the lattice structure. A curing process may then be conducted using the plate 640 and the reflector surface tool 650. Following an appropriate cure process, the lattice structure may be expected to retain the desired nonplanar shape and the structure may be bonded to a reflector shell 660, Detail J.

Figure 7:
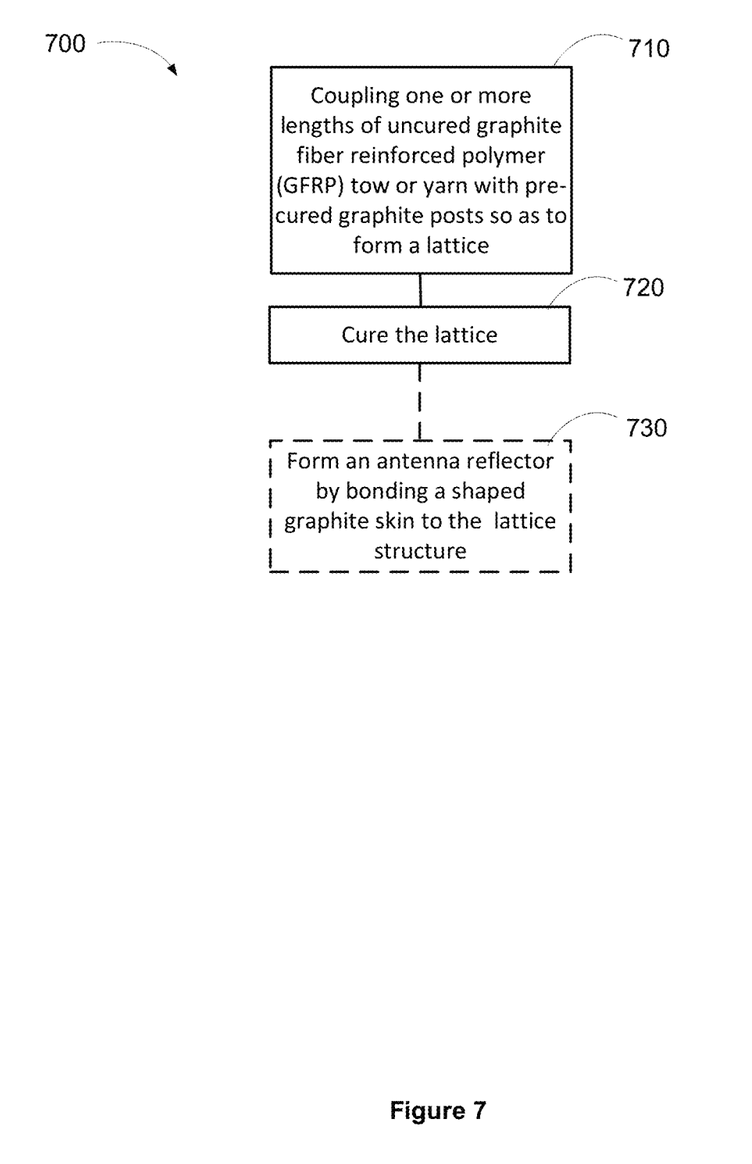
FIG. 7 illustrates a method for fabricating a lattice structure, according to an implementation.

Referring now to FIG. 7, a method for fabricating a lattice structure will be described. The method 700 may include a step 710 of forming a plurality of strut elements for the lattice structure. The strut elements may be formed by coupling one or more lengths of uncured graphite fiber reinforced polymer (GFRP) tow or yarn with pre-cured graphite posts so as to form a lattice.

At step 720, the lattice may be cured. The lattice may be cured by heating in an oven, for example, as a result of which the lengths of GFRP may develop a considerable bending stiffness and resistance to compressive loads.

In some implementations, referring still to FIG. 7, an antenna reflector may be formed, at step 730, by bonding a shaped graphite skin, or other RF reflective surface, to the lattice structure.

Figure 8:
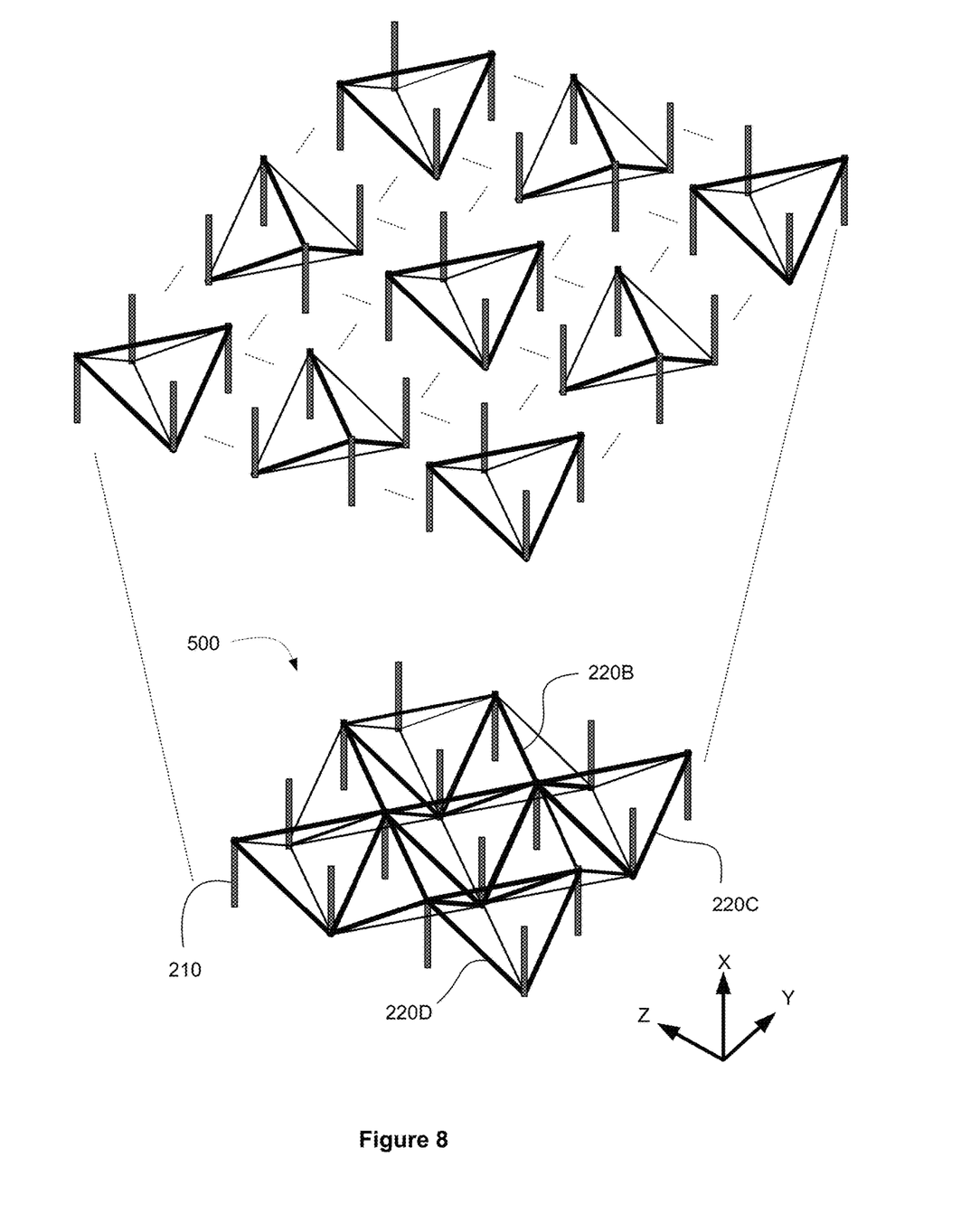
FIG. 8 illustrates lattice structure, according to another implementation.

FIG. 8 illustrates a lattice structure according to another implementation. The lattice structure 800 has tetrahedral-like truss arrangements. Considered separately, each tetrahedral-like truss arrangement may be described as including six diagonal truss elements and four posts. It will be appreciated, however, that in the assembled lattice, adjacent truss elements and posts are shared in common by adjacent truss arrangements. For example, in the 3×3 lattice structure 800, there are 16 posts 210. In addition, the 3×3 lattice structure includes nine struts 220B in each of two planes parallel to the YZ plane, three struts 220C in each of four planes parallel to the XY plane, and three struts 220D in each of four planes parallel to the XZ plane.

Although, for clarity of illustration, the implementations illustrated in the preceding figures include a single layer of substantially co-planar truss arrangements, it is contemplated that, in some implementations two or more layers may be mechanically coupled in a stacked arrangement.

Thus, an improved lattice structure has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. An apparatus comprising:
a lattice structure, the structure including a plurality of strut elements and posts, the plurality of strut elements, wherein:
the lattice structure results from coupling one or more lengths of uncured graphite fiber reinforced polymer (GFRP) tow or yarn with the posts so as to form a lattice, then curing the lattice.

2. The apparatus of claim 1, wherein the GFRP tow is an untwisted bundle of continuous filaments.

3. The apparatus of claim 1, wherein the posts are pre-cured graphite.

4. The apparatus of claim 1, wherein the lattice includes a plurality of open tetrahedral-like truss arrangements, each open tetrahedral-like truss arrangement including six strut elements and four pre-cured graphite posts.

5. The apparatus of claim 4, wherein each open tetrahedral-like truss arrangement is disposed within an open rectangular cuboid formed by coupling one or more additional lengths of uncured GFRP tow or yarn to the pre-cured graphite posts, then curing the lattice.

6. The apparatus of claim 4, wherein each of the plurality of truss arrangements shares at least one post and one strut element with an adjoining one of the plurality of truss arrangements.

7. The apparatus of claim 1, further comprising a shaped RF-reflective skin, bonded to the lattice structure.

8. A structure comprising:
a plurality of open tetrahedral-like truss arrangements, each open tetrahedral-like truss arrangement including six truss elements, wherein:
the structure results from coupling one or more lengths of uncured graphite fiber reinforced polymer (GFRP) tow or yarn to pre-cured graphite posts so as to form a lattice of the truss arrangements, then curing the lattice.

9. The structure of claim 8, wherein the GFRP tow is an untwisted bundle of continuous filaments.

10. The structure of claim 8, wherein each open tetrahedral-like truss elements is disposed within an open rectangular cuboid formed by coupling one or more additional lengths of uncured GFRP tow or yarn to the pre-cured graphite posts.

11. The structure of claim 8, wherein each of the plurality of truss arrangements shares at least one post and one strut element with an adjoining one of the plurality of truss arrangements.

12. An antenna reflector comprising:
a shaped RF-reflective skin; and
a lattice structure, the lattice structure including a plurality of strut elements, wherein:
the lattice structure results from coupling one or more lengths of uncured graphite fiber reinforced polymer (GFRP) tow or yarn with pre-cured graphite posts so as to form a lattice, then curing the lattice; and
the shaped skin is bonded to the lattice structure.

13. The antenna reflector of claim 12, wherein the lattice is shaped to conform to a surface contour of the shaped RF-reflective skin and then cured.

14. The antenna reflector of claim 12, wherein the lattice includes a plurality of open tetrahedral-like truss arrangements, each open tetrahedral-like truss arrangement including six strut elements and four pre-cured graphite posts.

15. The antenna reflector of claim 14, wherein each open tetrahedral-like truss arrangement is disposed within an open rectangular cuboid formed by coupling one or more additional lengths of uncured GFRP tow or yarn to the pre-cured graphite posts, then curing the lattice.

16. The antenna reflector of claim 12, wherein the shaped RF-reflective skin is a graphite composite.

17. A method comprising:
forming a plurality of strut elements for a lattice structure, by coupling one or more lengths of uncured graphite fiber reinforced polymer (GFRP) tow or yarn with pre-cured graphite posts so as to form a lattice; and
curing the lattice.

18. The method of claim 17, wherein the lattice includes a plurality of open tetrahedral-like truss arrangements, each open tetrahedral-like truss arrangement including six strut elements and four pre-cured graphite posts.

19. The method of claim 18, wherein each open tetrahedral-like truss arrangement is disposed within an open rectangular cuboid formed by coupling one or more additional lengths of uncured GFRP tow or yarn to the pre-cured graphite posts, then curing the lattice.

20. The method of claim 17, further comprising forming an antenna reflector by bonding a shaped graphite skin to the lattice structure.

* * * * *